UNITED STATES PATENT OFFICE.

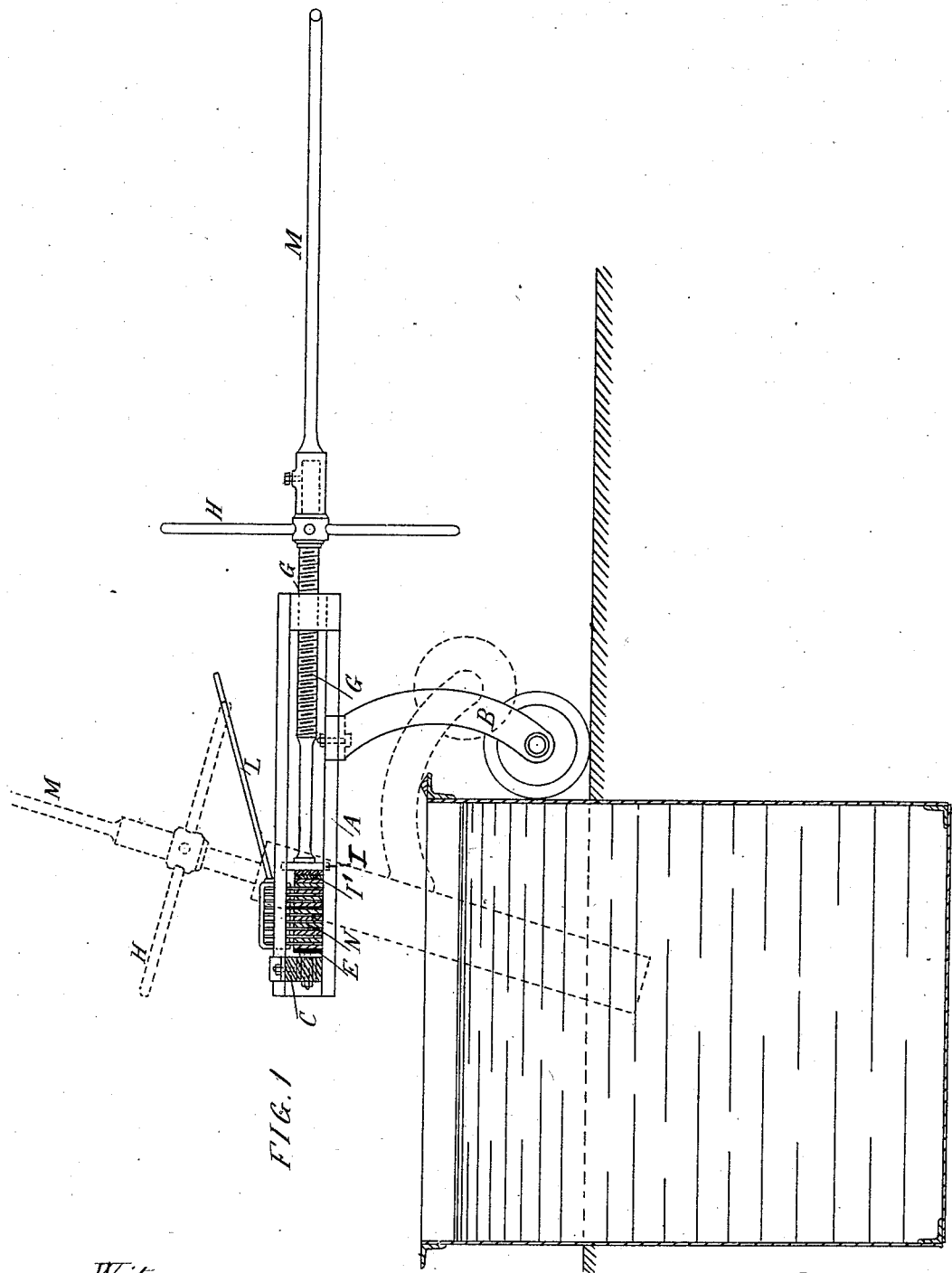

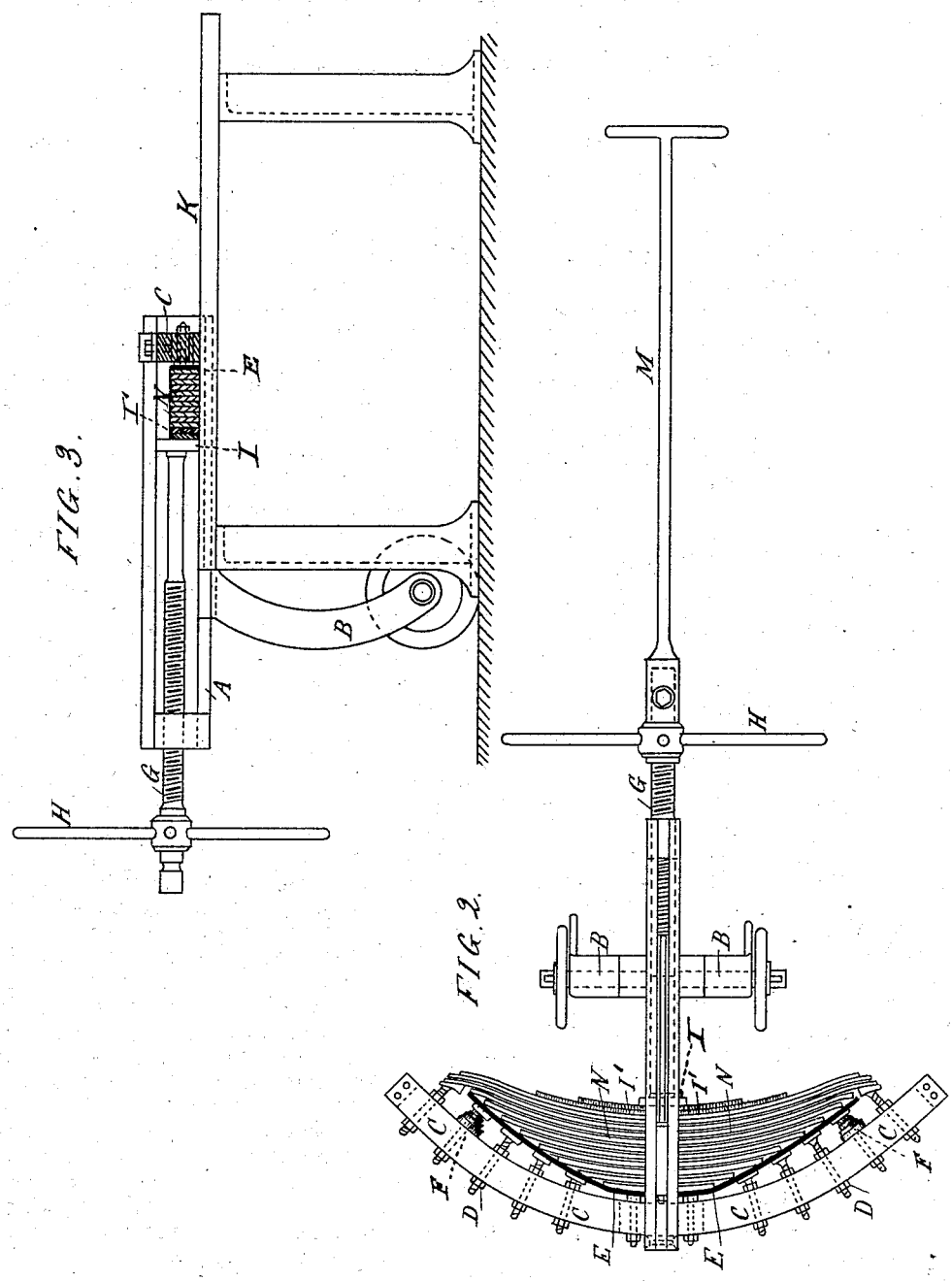

HERBERT WOODRUFF AND GEORGE BARSON, OF SHEFFIELD, ENGLAND.

APPARATUS FOR MAKING SPRINGS.

SPECIFICATION forming part of Letters Patent No. 268,164, dated November 28, 1882.

Application filed August 19, 1882. (No model.) Patented in England January 18, 1882, No. 253.

*To all whom it may concern:*

Be it known that we, HERBERT WOODRUFF and GEORGE BARSON, both of Sheffield, in the Kingdom of England, have invented certain new and useful Improvements in the Manufacture of Laminated Springs and in Apparatus to be used for this Purpose, of which the following is a specification.

This invention has reference to an improved process of and apparatus for bending and hardening laminated or leaf springs; and the invention consists, first, of a process of bending and hardening the leaves which form the laminated spring by first shaping the heated leaves in an elastic mold, then separating them so as to be a short distance apart from each other, then immersing the same into water to harden the leaves, and, finally, tempering and completing the spring.

The invention consists, secondly, of an apparatus by which the springs are shaped and immersed, as will appear more fully hereinafter, and finally be pointed out in the claims.

In the accompanying drawings, Figure 1 represents a side elevation, partly in section, of our improved apparatus for bending and hardening laminated springs. Fig. 2 is a plan; and Fig. 3, a sectional side view of the same placed in position on a working-bench, to insert the spring-leaves.

Similar letters of reference indicate corresponding parts.

To bend the leaves into proper form and hold them while they are hardened, we employ a narrow oblong frame or cramp, A, mounted upon wheels B, or otherwise supported, as may be found most convenient, either vertical, horizontal, or otherwise, (in the drawings it is shown horizontal,) so that it may readily be moved about from place to place. Preferably it is formed with legs projecting from the longer sides near the center, and having supporting-wheels mounted upon it, so that the frame may be moved about from place to place.

To one end of the frame or cramp is secured a long block, C, which is of a curved form, and provided with screw-bolts D, passing through it, having nuts on each side of the block, so that the screw-bolts can be firmly secured in position. These bolts have enlarged heads formed at their inner ends, which heads bear upon a plate of steel, E, that forms both a sliding and pressing surface acting upon the leaves of steel which compose the spring. This plate E is curved in such a manner as to conform to the outer circumference of the laminated spring, but so made that it will follow up any change in the form of the spring during the process of manufacture. To obtain this elasticity, one or more springs of any convenient form are used in connection with the screw-bolts at each side of the frame A, a volute spring, F, being shown in the drawings. Through the other end of the cramp or frame A passes a long screw, G, parallel with the longer sides of the cramp, which screw has a follower, I, at one end and at the outer end a hand-wheel, H. By this or any other means the necessary pressure is applied to form the spring to the desired shape. The spring-leaves are first heated in the furnace, and then inserted in the frame or cramp A, so that their ends rest upon the steel plate E. They may be threaded upon a mandrel if the plates have holes in the center, or, if studded, they will be secured in some convenient manner. The follower, I, presses a block, I', which is composed of one or more spring-plates that have been previously cambered or bent to the required form against the spring-leaves. The block I' may be interposed between the follower I and the spring-leaves, or it may be attached to the end of the follower I. By turning the hand-wheel H the screw will be put in motion and the leaves confined between the plate E and the block or plates I', and thereby pressed into shape. This work is done while the machine is supported on a suitable bench, K, that has a central groove or opening in it to receive the lower part of the frame or cramp. When the spring-leaves have been shaped the hand-wheel H is reversed, which relieves the pressure on the leaves and causes them to separate from each other by the action of the plate E and springs F.

To insure the complete separation of the leaves, a tool, L, in the form of a comb is used, the number of teeth corresponding with the number of spaces between the plates of the spring. The teeth of the comb are driven in between the leaves, so forcing them apart, after which the comb may or may not be removed before insertion in the water. Having fixed the comb in position, the handle M is also affixed to the end of the screw G, and the apparatus is ready for removal to the bosh or water-tank to be immersed in the water to harden the leaves. The lever M is then elevated, as shown in Fig. 1 in dotted lines, so that the apparatus is tilted and the leaves are immersed in the water. By moving the handle backward and forward a reciprocating motion is given to the leaves in the water, which will force the water through the intermediate spaces and insure the complete and uniform hardening of the leaves. When the spring is cold the handle M is drawn down and the apparatus wheeled away to the furnace for tempering previous to hooping and completing the spring.

The advantages of our improved apparatus are, first, that the same is portable, and can thereby be quickly and easily moved from place to place; secondly, the simplicity by which the spring-leaves are immersed into water and reciprocated in the same, for quickly hardening the spring; thirdly, that the leaves may be pressed in one operation, or, if desired, may be pressed and hardened in certain sections.

Having thus described our invention, we claim as new and desire to secure by Letters Patent—

1. The combination of a wheeled frame or cramp, A, curved block C, headed screws D, shaping-plate, E, follower I, and pressing-plates I', substantially as set forth.

2. The combination of a wheeled frame or cramp, A, curved block C, having headed screws D, one or more of which at each side of the cramp are provided with springs F, shaping-plate E, follower I, pressing-plates I', and screw-rod G, substantially as described.

3. The combination of a wheeled frame or cramp, A, curved block C, screws D, shaping-plate E, follower I, pressing-plates I', screw-rod G, and separating-comb L, substantially as set forth.

In testimony that we claim the foregoing as our invention we have signed our names in presence of two subscribing witnesses.

HERBERT WOODRUFF.
GEORGE BARSON.

Witnesses:
C. B. WEBSTER,
   *U. S. Consul.*
F. F. HIBBERT,
   *His Clerk.*